United States Patent

Brouwer et al.

[15] 3,687,928

[45] Aug. 29, 1972

[54] PROCESS OF ISOLATING NATIVE ALBUMIN AND/OR GLOBULIN FROM AN AQUEOUS SYSTEM COMPRISING RAISING THE PH TO ABOVE 8.5 AND THEN LOWERING THE PH TO THE ISOELECTRIC POINT TO PRECIPITATE PROTEIN

[72] Inventors: Abraham Brouwer, Harderwijk; Gerardus M. A. M. VanLoom, Reeuwijk, both of Netherlands

[73] Assignee: Melkcentrale Gouda N.V.

[22] Filed: April 21, 1970

[21] Appl. No.: 30,601

[30] Foreign Application Priority Data

April 22, 1969 Netherlands.............69.06198

[52] U.S. Cl. ............260/122, 260/112 B, 260/112 R
[51] Int. Cl. ...............................................C07g 7/00
[58] Field of Search ..................260/112, 112 B, 122

[56] References Cited

UNITED STATES PATENTS

| | | | |
|---|---|---|---|
| 2,450,810 | 10/1948 | Opper et al. | 260/112 |
| 3,476,739 | 11/1969 | Liggett | 260/123.5 |
| 669,361 | 3/1901 | Deycke | 260/122 |
| 1,428,820 | 9/1922 | Thomson | 260/122 |
| 2,219,791 | 10/1940 | Rabald et al. | 260/112 |
| 2,391,559 | 12/1945 | Faulkner | 260/122 X |
| 2,460,550 | 2/1949 | Strumia et al. | 260/112 |
| 2,684,960 | 7/1954 | Taylor | 260/123.5 |
| 2,923,665 | 2/1960 | Hagan et al. | 260/112 X |
| 3,018,280 | 1/1962 | Salzberg et al. | 260/123.5 X |

OTHER PUBLICATIONS

J. Am. Chem. Society, Vol. 48, 1926, pp. 763– 768, Csonka et al.
Industrial and Engineering Chemistry, Vol. 31, 1939, Smith et al., al., pp. 1284– 1288
Chem. Abstracts, Vol. 44, 1950, 5416 P–1, Cammarata et al.

*Primary Examiner*—Howard E. Schain
*Attorney*—Fleit, Gipple & Jacobson

[57] ABSTRACT

A process for isolating from an aqueous solution in their natural form proteins of the class of albumin, globulin and mixtures thereof which includes raising the pH of the aqueous protein solution to at least 8.5 and then flocculating the protein at its iso-electric point.

8 Claims, No Drawings

PROCESS OF ISOLATING NATIVE ALBUMIN AND/OR GLOBULIN FROM AN AQUEOUS SYSTEM COMPRISING RAISING THE PH TO ABOVE 8.5 AND THEN LOWERING THE PH TO THE ISOELECTRIC POINT TO PRECIPITATE PROTEIN

The invention relates to a process of isolating native albumin and/or globulin from an aqueous system, such as whey and blood, by first of all raising the pH of the system and subsequently flocculating the protein at the isoelectric point.

From the Dutch Patent Application No.293,320 there is already known a process at which at room temperature, and with due regard to some cation-anion interaction conditions, the pH of an acid whey with the aid of a weak ion exchanger, such as Montmorillonite, is steadily increased from 4 to 7 and immediately thereupon to 8 by adding small quantities of calcium hydroxide, which causes various protein fractions to be precipitated. However, a disadvantage of said method is, that the manufacturing costs of the resultant protein fractions are disproportionate to those of the proteins that are on the market already.

From the Dutch Patent Application No. 254,554 there is known another process in which whey is first of all evaporated under vacuum and immediately thereupon concentrated to a total solids content of 80-85 percent by weight by injecting steam. Although the resultant product is watersoluble, this process has still the disadvantage that the salt content of the resultant whey paste is too high, as a result of which the use thereof is very limited.

In the German Patent Specification No. 830,153 there has been disclosed a process of processing whey by adding to each liter of whey 0.2 to 2 g of iron, in the form of iron compounds, such as ferric chloride, and isolating the resultant precipitate containing albumin and phosphoric acid of the whey.

According to the process disclosed in the German Patent Specification No. 835,982, albumins and phosphates are also precipitated from whey by adding an iron salt, but moreover the pH is also raised to about 8. A disadvantage of said processes, in which iron salts are used to precipitate the albumins, is, naturally, that the iron remains in the product in the form of the hydroxide, because of which the natural white of the proteins is detrimentally affected.

The British Patent Specification No. 1,045,860 discloses a process in which albumins are precipitated by adding polyphosphates, such as sodium or potassium-metaphosphate, as lactalbumin phosphates.

The German Patent Specification No. 810,687 discloses a process in which the pH of acid whey is first of all raised to 7-7.5, subsequently it is heated to 100° C and immediately cooled to 40° C, whereas the pH is decreased to the isoelectric point of albumin. A disadvantage of said process is that the resultant proteins are denatured by the heating process.

It was found now that albumins and/or globulins, without any of the problems associated with the process of the German Patent Specification No. 810,687, may be isolated in native form from an aqueous system like whey and blood by raising the pH of the system to at least 8.5 by adding physiologically tolerable basic compounds at a temperature below the denaturing temperature of albumins and/or globulins, immediately thereupon decreasing the pH to the isoelectric point of the albumins and/or globulins ($\pm$ 0.1) by adding an acid at a temperature below the denaturing temperature of albumins and/or globulins, separating off the precipitated proteins, and, if desired, repeating the entire process once or more than once. Owing to this variation in pH values, the linkage between the protein, the anions and cations is broken or weakened, causing a decrease of the solubility of the protein at its isoelectric point. The process is generally carried out at a temperature of from 40° till 50° C.

If whey is used as a starting material, preferably a mixture of equal parts of water and the liquor, which remains after the lactose has been removed from whey which is evaporated to a solids content of 60 percent by weight, is used. This liquor is obtained by separating off the crystallized lactose by passing it through a centrifuge. The resultant liquor contains 10–12 percent by weight of albumins + globulins. After dilution with an equal quantity of water there is thus obtained a starting material containing 5–6 percent by weight of albumin + globulin.

Another proper starting material is aqueous solution of whey powder.

When blood and blood serum (blood passed through a centrifuge) are used as the starting material, it is also preferable to dilute it with equal quantities of water before heating and rendering alkaline.

When blood is used as the starting material, the process is less complicated than when whey is used as the starting material, because the salt content of blood is lower than that of whey. The adjustment of the pH of at least 8.5 is preferably made at a temperature of 45° C. All physiologically tolerable bases, such as NaOH, KOH, and Ca(OH$_2$) may be used for said purpose. However, 33 percent sodium hydroxide is preferably used. The pH of 9 may be liberally exceeded, though the pH is preferably adjusted to 9.5 – 10.5. The adjustment of the pH for the isoelectric point may be made at any temperature below the denaturing temperature of albumins and/or globulins, though a temperature ranging from 40°–50° C is preferably used. There are no specific demands made on the acid to be used, apart from the physiological tolerance. Suitable acids are, for instance, HCl, H$_2$SO$_4$, H$_3$PO$_4$ and organic acids, in particular citric acid.

The pH is preferably accurately adjusted to the isoelectric point, which is between 4.0 – 5.2 depending on the salt content. When the pH values are too low, the protein will start to dissolve again. pH values that are lower than those corresponding with the isoelectric point should therefore be avoided. Albumins and/or globulins will start to flocculate as soon as the acid is added, because there will be a sufficient, local concentration of acid to invoke flocculation. These local, relatively high concentrations can occur in their return because stirring has to be done at slow speed, so as not to damage the structure of the resultant floccules. There are no serious objections to this local flocculation, however, because the resultant flocculation is entirely in accordance with the object of the invention. When the flocculating process of the albumins and/or globulins has been completed, they may be isolated by conventional methods, such as by being passed through a centrifuge with a great force of gravitation, and air dried. In many cases the salt content of the albumin and/or globulin will be higher than is desirable for food purposes. In these cases the isolated product at room temperature is redissolved in water rendered alkaline until a solution is obtained containing 5–6 percent by weight of albumin and/or globulin, the pH is raised to at least 8.5 by adding physiologically tolerable basic compounds at a temperature below the denaturing temperature of the albumin and/or globulin, the pH is immediately thereupon decreased to the isoelectric point (± 0.1) by adding an acid at a temperature below the denaturing temperature of albumin and/or globulin, the precipitated proteins are separated off, and, if desired, the entire process is repeated once or more than once. The final product is soluble in neutral or slightly basic medium.

EXAMPLE I

A mixture of 10 liters of pig's blood and 10 liters of water was heated to 40° C in a round-bottomed flask in a water bath. 33 percent sodium hydroxide was then added to pH=10. 35 percent hydrochloric acid was then immediately added until the mixture had a pH of 5.1. The albumin and globulin then started to flocculate. The entire mixture was passed through a centrifuge, which yielded a still slightly colored protein percipitate. This was dispersed in water with pH=8. The whole process was then repeated. The resultant product, after having been air dried for 24 hours, was 90 percent pure.

EXAMPLE II 10 liters of evaporated whey having a solids content of 30 percent by weight was heated to 41° C. 33 percent sodium hydroxide was then added to pH=11.5. 35 percent hydrochloric acid was immediately thereupon added with slow stirring to pH=4.0. The albumins and globulins started to flocculate and could be concentrated with the aid of a centrifuge. The centrifugal cake was suspended in water to a protein concentration of 5 percent by weight. The dispersion was then heated to 41° C and dissolved with 30 percent sodium hydroxide at pH=9. By adding 35 percent hydrochloric acid the proteins were re-precipitated at pH=4.1. The resultant flocculated protein was concentrated by means of a centrifuge and suspended in water to a solids content of 20 percent by weight. The resultant protein was dissolved in a mixture of water and 30 percent sodium hydroxide, with pH=8.5, and the resultant mixture was then dried in a spray drier at temperatures up to 80° C. The final product contained 90 percent by weight of protein.

EXAMPLE III

In a beaker having a content of 15 liters there were admixed 4 liters of liquor, having a protein content of 10 percent by weight, and 6 liters of water. The mixture was heated with stirring to 46° C, while special care was taken that there was no local overheating and no air was whipped into it. To this mixture was added 30 percent sodium hydroxide with vigorous stirring until the pH was 10.5. After 2 minutes, with slow stirring, and by adding 35 percent hydrochloric acid the pH was decreased to 4.1. The protein coagulated and precipitated slowly as a white floccular mass. When the above-mentioned clear liquid had been decanted, the protein was first of all passed through a centrifuge and then taken up in water again, the pH of the water had been adjusted to pH=4.1 with hydrochloric acid. After having been stirred and optionally decanted, the liquid was passed through the centrifuge again, and the protein was then taken up in water and dissolved in water, that had been adjusted to pH=8.5 with NaOH, with vigorous stirring. After reprecipitation with acetic acid at pH=4.1 the liquid was passed through the centrifuge again. The resultant protein with stirring was dissolved in water having pH=8 to as great a concentration as was possible. The resultant solution was dried in a spray drier having an air temperature of 85° C. The resultant product was water-soluble and had the following analytical values:

86 percent by weight of protein
5 percent by weight of moisture
a trace of lactose
5 percent by weight of ashes some percentages of organic salts.

It is to be understood that the above examples are only for purposes of illustration and are in no way to limit the invention thereto. Furthermore, this invention can be practiced using other similar compounds and reactions without departing from the scope of the invention as set forth in the appended claims.

What is claimed:

1. A process for isolating a protein in its natural form selected from the group consisting of albumin, globulin and mixtures thereof from blood or whey, which comprises raising the pH of the solution to at least 8.5 by the addition of a composition consisting essentially of a physiologically compatible basic compound at a temperature below the denaturing temperature of the protein, decreasing the pH immediately thereupon to the iso-electric point of the protein by the addition of a composition consisting essentially of an acid at a temperature below the denaturing temperature of the protein and separating the precipitated protein from the solution.

2. A process according to claim 1 wherein the initial protein solution contains a mixture of albumin and globulin 5 to 6 percent by weight.

3. A process according to claim 2 wherein the naturally occurring aqueous solution is blood.

4. A process according to claim 2 wherein the naturally occurring aqueous solution is whey.

5. A process according to claim 1, in which the precipitated albumin and globulin is redispersed to an aqueous solution, which is used as the starting material for repeating the process.

6. A process according to claim 1 wherein the pH is raised to 9.5–10.5 by the addition of basic compound.

7. A process according to claim 1 wherein the acid is added at 45° centigrade.

8. A process according to claim 1 wherein the separation of the protein is accomplished by passing the solution through a centrifuge.

* * * * *